United States Patent
Kopikare et al.

(10) Patent No.: US 7,502,358 B1
(45) Date of Patent: Mar. 10, 2009

(54) DIFFUSION BUCKET SCHEDULER FOR WIRELESS NETWORK DEVICES

(75) Inventors: Rahul Kopikare, Livermore, CA (US); Senthil K. Arumugham, Sunnyvale, CA (US); Milind Kopikare, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 646 days.

(21) Appl. No.: 11/101,047

(22) Filed: Apr. 6, 2005

Related U.S. Application Data

(60) Provisional application No. 60/617,284, filed on Oct. 7, 2004.

(51) Int. Cl.
*H04J 3/16* (2006.01)
*H04B 7/212* (2006.01)
*H04L 12/403* (2006.01)

(52) U.S. Cl. .................. 370/346; 370/348; 370/449
(58) Field of Classification Search .............. 370/346, 370/348, 449
See application file for complete search history.

(56) References Cited

U.S. PATENT DOCUMENTS

| 6,816,505 B1 | 11/2004 | Sutardja et al. | |
|---|---|---|---|
| 2005/0152324 A1* | 7/2005 | Benveniste | 370/338 |
| 2005/0270975 A1* | 12/2005 | Meylan et al. | 370/229 |
| 2006/0052088 A1* | 3/2006 | Pavon et al. | 455/414.1 |
| 2006/0057968 A1* | 3/2006 | Ohtani | 455/67.16 |

OTHER PUBLICATIONS

Marvell Semiconductor, Inc.; Libertas Wireless LAN 802.11g(b) Client Chipset 88W8000G and 88W8310, Apr. 2003, 2 pages.
Ian Sherlock, Texas Instruments; Understanding QoS Issues for 802.11, Mar. 2004 issue of Portable Design Magazine, 5 pages.
Dennis O'Reilly; Wi-Fi Improvements in the Works, PCWorld.com, Dec. 3, 2003, 2 pages.
Simon Chung and Damila Piechota, Silicon Software Systems; Understanding the MAC Impact of 802.11e: Part 1, Oct. 29, 2003 CommsDesign.com, 6 pages.
Simon Chung and Damila Piechota, Silicon Software Systems; Understanding the MAC Impact of 802.11e: Part 2, Oct. 30, 2003 CommsDesign.com, 8 pages.
Wataru Gohda; Wi-Fi Alliance Technical Committee Quality of Service (QoS) Task Group WMM Scheduled Access (WMM-SA) Specification, Oct. 2004, 36 pages.
ANSI/IEEE Std 802.11, 1999 Edition, Information technology-Telecommunications and information exchange between systems-Local and metropolitan area networks-Specific requirements-Part 11: Wireless LAN Medium Access Control (MAC) and Physical Layer (PHY) Specifications, Sponsor LAN MAN Standards Committee of the IEEE Computer Society, 528 pp., Dec. 1999.

(Continued)

Primary Examiner—Barry W Taylor

(57) ABSTRACT

A scheduler for a wireless network including N wireless stations having N bandwidth parameters, respectively, comprises a framing module that generates a schedule frame including schedule slots. An assigning module assigns N sets of TxOps to the N wireless stations based on the N bandwidth parameters, respectively. Each of the schedule slots includes zero or one transmission opportunity (TxOp) for each of the N wireless stations. A polling module polls the N wireless stations based on the TxOps defined in respective ones of the N sets of TxOps.

55 Claims, 11 Drawing Sheets

OTHER PUBLICATIONS

IEEE Std 802.11a-1999 (Supplement to IEEE Std 802.11-1999), Supplement to IEEE Standard for Information technology-Telecommunciations and information exchange between systems-Local and metropolitan area networks-Specific requirements, Part 11: Wireless LAN Medium Access Control (MAC) and Physical Layer (PHY) specifications, High-speed Physical Layer in the 5GHz Band, Adopted by the ISO/IEC and redesignated as ISO/IEC 8802-11:1999/Amd 1:2000(E), Sponsor LAN/MAN Standards Committee of the IEEE Computer Society, 91 pp., Dec. 1999.

IEEE Std 802.11b-1999, Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: Higher-Speed Physical Layer Extension in the 2.4GHz Band, Sponsor LAN/MAN Standards Committee of the IEEE Computer Society, 96 pp., Dec. 1999.

IEEE P802.11e/D11.0, Oct. 2004 (Amendment to ANSI/IEEE Std 802.11-1999 (2003 Reaff) edition as amended by IEEE Std 802.11g-2003, IEEE Stad 802.11h-2003 and IEEE 802.11i-2004), IEEE Standard for Information technology-Telecommunications and information exchange between systems-Local and metropolitan area networks-Specific requirements, Part 11: Wireless Medium Access Control (MAC) and Physical Layer (PHY) specifications: Amendment 7: Medium Access Control (MAC) Quality of Service (QoS) Enhancements, Sponsor LAN/MAN Committee of the IEEE Computer Society, 185 pp.

IEEE P802.11g/D8.2, Apr. 2003 (Supplement to ANSI/IEEE Std 802.11 1999 (Reaff 2003)), IEEE P802.11g/D8.2, Draft Supplement to Standard [for] Information Technology-Telecommunications and information exchange between systems-Local and metropolitan area networks-Specific requirements-Part 11: Wireless LAN Medium Access Control (MAC) and Physical Layer (PHY) specifications: Further Higher Data Rate Extension in the 2.4 GHz Band, Sponsor LAN/MAN Standards Committee of the IEEE Computer Society, 69 pp.

* cited by examiner

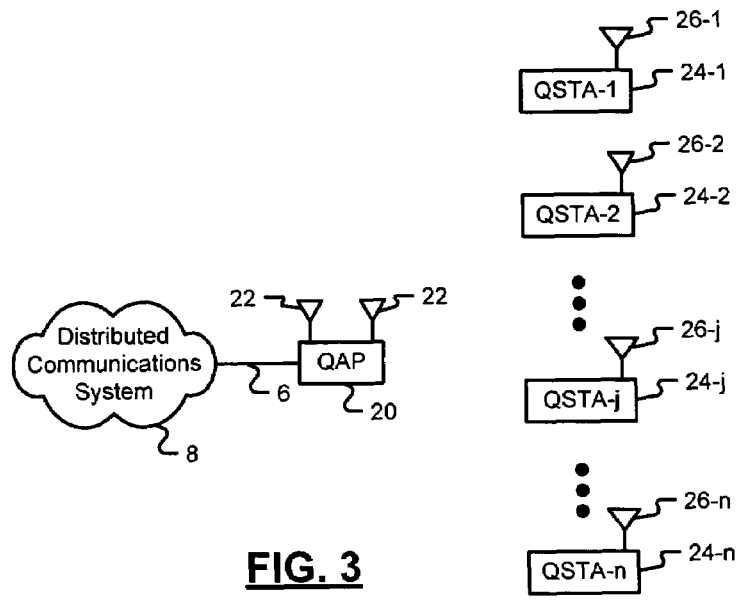
FIG. 3
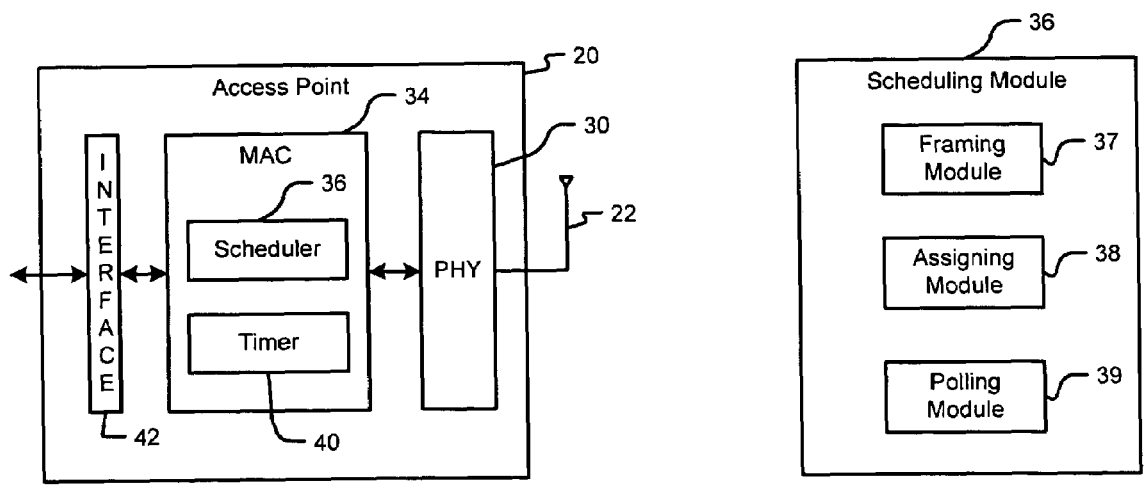
FIG. 4A          FIG. 4B

MinSI$_1$ = MaxSI$_1$ = 20mS     F$_1$ = 4
MinSI$_2$ = MaxSI$_2$ = 30mS     F$_2$ = 6
MinSI$_3$ = 0mS, MaxSI$_3$ = 5mS     F$_3$ = 1

GCD (1,20,30) = 1
GCD (2,20,30) = 2
GCD (3,20,30) = 1
GCD (4,20,30) = 2
GCD (5,20,30) = 5

SchedInt = 5mS

| Slot No. | 0 | 1 | 2 | 3 | 4 | 5 | 6 | 7 | 8 | 9 | 10 | 11 |
|---|---|---|---|---|---|---|---|---|---|---|---|---|
| STA-1 | X |  |  |  | X |  |  |  | X |  |  |  |
| STA-2 | X |  |  |  |  |  | X |  |  |  |  |  |
| STA-3 | X | X | X | X | X | X | X | X | X | X | X | X |

FIG. 10F

$MinSI_1 = MaxSI_1 = 20mS \quad F_1 = 2$
$MinSI_2 = MaxSI_2 = 30mS \quad F_2 = 3$
$MinSI_3 = 18mS, MaxSI_3 = 22mS \quad F_3 = 2$ GCD (18,20,30) = 2
GCD (19,20,30) = 1
GCD (20,20,30) = 10
GCD (21,20,30) = 1
GCD (22,20,30) = 2

206

104 — SchedInt = 10mS

| Slot No. | 0 | 1 | 2 | 3 | 4 | 5 |
|---|---|---|---|---|---|---|
| STA-1 | X |   | X |   | X |   |
| STA-2 | X |   |   | X |   |   |
| STA-3 |   | X |   | X |   | X |

$MinSI_1 = MaxSI_1 = 20mS$
$MinSI_2 = MaxSI_2 = 30mS$

208

104 — SchedInt = 10mS

| Slot No. | 0 | 1 | 2 | 3 | 4 | 5 |
|---|---|---|---|---|---|---|
| STA-1 | X |   | X |   | X |   |
| STA-2 |   | X |   |   | X |   |

DIFFUSION BUCKET SCHEDULER FOR WIRELESS NETWORK DEVICES

CROSS-REFERENCE TO RELATED APPLICATIONS

This application claims priority of U.S. Provisional Patent Application Ser. No. 60/617,284, filed on Oct. 7, 2004, the specification of which is hereby incorporated herein by reference.

FIELD OF THE INVENTION

The present invention relates to wireless network interfaces supporting a quality of service (QoS) protocol.

BACKGROUND OF THE INVENTION

Referring now to FIG. 1, a wireless local area network 2 is shown. A wireless access point 4 has a connection 6 to a distributed communications system (DCS) 8 such as the Internet. One or more wireless stations 10-1, 10-2, 10-3, ..., 10-n (collectively wireless stations 10), are in wireless communication with the access point 4. The access point 4 provides each of the wireless stations 10 with a communication path to the DCS 8.

Referring now to FIG. 2, an example of wireless transmissions between the wireless access point 4 and the wireless stations 10 is shown. The wireless transmissions employ a Carrier Sense Multiple Access with Collision Avoidance (CSMA/CA) protocol. The CSMA/CA protocol allows any wireless station 10 to access the access point 4 using a Distributed Coordination Function (DCF).

When using DCF to contact the access point 4, the wireless stations 10 monitors activity. If the wireless stations 10 do not detect the wireless access point 4 and/or one of the wireless stations 10 during a DCF Interframe Space (DIFS) 12, then one of the wireless stations 10 may transmit 14. The wireless station 10 that is allowed to transmit 14 is determined during a contention window 16 that begins after the DIFS period 12. At the end of the DIFS period 12, each of the wireless stations 10 selects a random number "r". During the contention window 16, each of the wireless stations 10 counts down from r to zero. The wireless station 10 that counts down to zero first is allowed to transmit first, thereby reducing the probability that a collision will occur. The access point 4 may transmit after a priority inter-frame space (PIFS) 14 and take priority over the wireless stations 10.

The CSMA/CA type protocol provides each wireless station 10 with an equal priority connection to the access point 4. However, none of the wireless stations 10 are guaranteed a minimum amount of bandwidth to the access point 4. Without having a minimum amount of bandwidth, one of the wireless stations 10 may suffer from a less than desirable quality of service (QoS) when its bandwidth to the access point 4 is less than a bandwidth it needs. Less than desirable QoS becomes increasingly likely as the number of wireless stations 10 communicating through the access point 4 increases.

SUMMARY OF THE INVENTION

A scheduler for a wireless network including N wireless stations having N bandwidth parameters, respectively, comprises a framing module that generates a schedule frame including schedule slots. An assigning module assigns N sets of TxOps to the N wireless stations based on the N bandwidth parameters, respectively. Each of the schedule slots includes zero or one transmission opportunity (TxOp) for each of the N wireless stations. A polling module polls the N wireless stations based on the TxOps defined in respective ones of the N sets of TxOps.

In other features, a system comprises the scheduler and further comprising a physical layer module that receives the N bandwidth parameters from the N wireless stations, respectively, wherein N is an integer greater than or equal to one. Each of the N bandwidth parameters include a maximum service interval, a minimum service interval, a packet size and a mean data rate.

In other features, the schedule slots are of equal duration. The assigning module substantially uniformly distributes the TxOps among the schedule slots in each of the N sets based on respective ones of the N bandwidth requirements. The assigning module shifts the TxOps in one of the N sets to an alternative set of TxOps when a packet error rate (PER) of a respective one of the N wireless stations exceeds a predetermined PER.

In other features, a wireless access point comprising the scheduler. The scheduler is implemented in a medium access control (MAC) module.

In still other features, each of the N bandwidth parameters include a service interval. The assigning module determines a greatest common denominator (GCD) of the N service intervals and least common multiples (LCMs) of the N service intervals, and wherein the schedule frame is based on the GCD and LCMs. The assigning module determines a TxOp duration of the TxOps for each of the N wireless stations. The TxOp duration of one of the N sets is different than the TxOp duration of another of the N sets. The physical layer device outputs TxOp durations to the N wireless stations. The duration of each schedule slot is equal to the GCD and the number of schedule slots in the schedule frame is based on the LCMs.

In other features, a wireless network comprises the access point and further comprising the N wireless stations. The wireless network is otherwise compliant with one of IEEE 802.11, 802.11a, 802.11b, 802.11g, 802.11h, and/or 802.11n.

In yet other features, the N bandwidth parameters of one of the N wireless stations includes include a minimum service interval that is different than a maximum service interval, which define a scheduling interval range. The assigning module calculates GCDs of potential service intervals in the scheduling interval range and the service intervals of others of the N wireless stations. The assigning module selects one of the potential service intervals having a largest GCD as a substitute service interval.

A software method for scheduling a wireless network including N wireless stations having N bandwidth parameters, respectively, comprises generating a schedule frame including schedule slots; assigning N sets of TxOps to the N wireless stations based on the N bandwidth parameters, respectively, wherein each of the schedule slots includes zero or one transmission opportunity (TxOp) for each of the N wireless stations; and polling the N wireless stations based on the TxOps defined in respective ones of the N sets of TxOps.

In other features, the method includes receiving the N bandwidth parameters from the N wireless stations, respectively, wherein N is an integer greater than or equal to one. Each of the N bandwidth parameters include a maximum service interval, a minimum service interval, a packet size and a mean data rate. The schedule slots are of equal duration. The method includes substantially uniformly distributing the TxOps among the schedule slots in each of the N sets based on respective ones of the N bandwidth requirements.

In other features, the method includes shifting the TxOps in one of the N sets to an alternative set of TxOps when a packet error rate (PER) of a respective one of the N wireless stations exceeds a predetermined PER. Each of the N bandwidth parameters include a service interval. The method includes determining a greatest common denominator (GCD) of the N service intervals and least common multiples (LCMs) of the N service intervals; and basing the schedule frame on the GCD and LCMs. The method includes determining a TxOp duration of the TxOps for each of the N wireless stations. The TxOp duration of one of the N sets is different than the TxOp duration of another of the N sets. The method includes assigning and transmitting TxOp durations to the N wireless stations.

In yet other features, the method includes setting the duration of each schedule slot equal to the GCD; and basing the number of schedule slots in the schedule frame on the LCMs. The N bandwidth parameters of one of the N wireless stations include a minimum service interval that is different than a maximum service interval, which define a scheduling interval range. The method includes calculating GCDs of potential service intervals in the scheduling interval range and the service intervals of others of the N wireless stations; and selecting one of the potential service intervals having a largest GCD as a substitute service interval. The wireless network is otherwise compliant with one of IEEE 802.11, 802.11a, 802.11b, 802.11g, 802.11h, and/or 802.11n.

Further areas of applicability of the present invention will become apparent from the detailed description provided hereinafter. It should be understood that the detailed description and specific examples, while indicating the preferred embodiment(s) of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a functional block diagram of a QoS-enhanced wireless local area network;

FIG. 4A is a functional block diagram of a transceiver and a QoS-enhanced wireless access point;

FIG. 4B is a functional block diagram of a scheduling module;

FIG. 11 illustrates an example schedule frame generated after monitoring a Packet Error Rate.

DETAILED DESCRIPTION OF THE PREFERRED EMBODIMENTS

Figure 1:
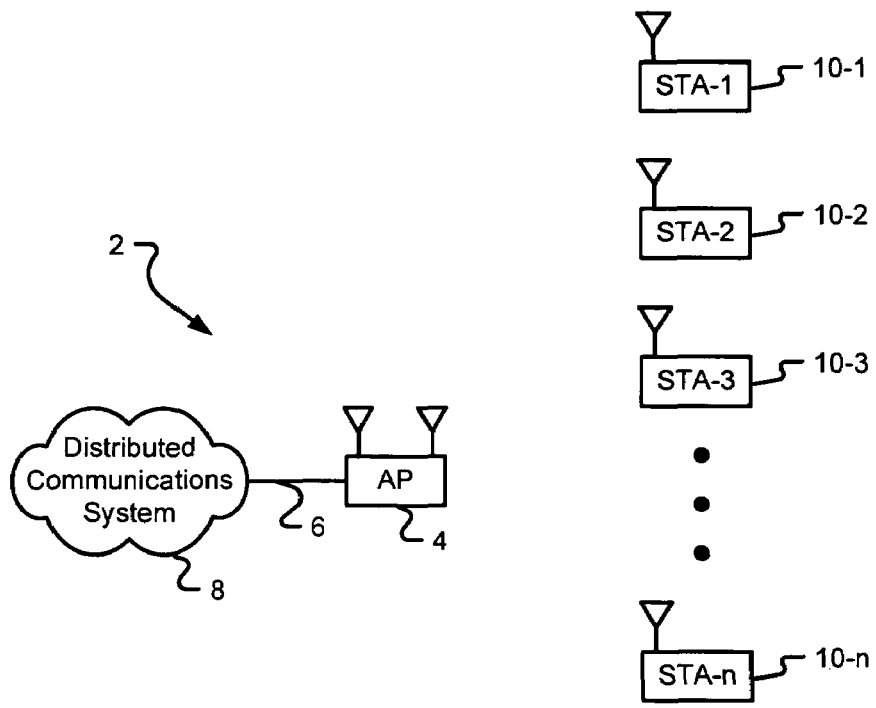
FIG. 1 is a functional block diagram of a wireless local area network.
Figure 2:
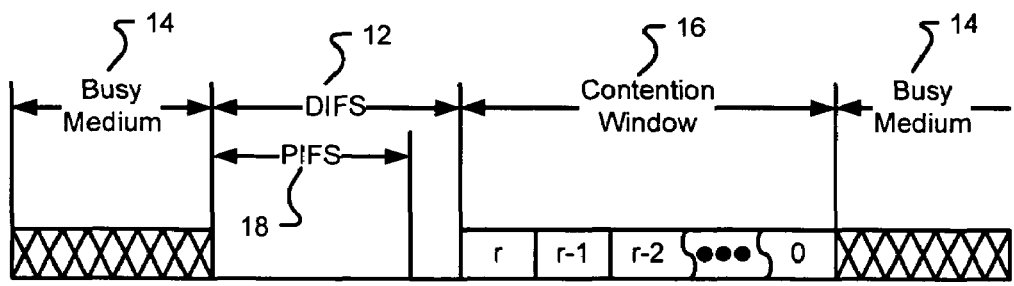
FIG. 2 illustrates a timeline of a CSMA/CA wireless transmission.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an Application Specific Integrated Circuit (ASIC), an electronic circuit, a processor (shared, dedicated, or group) and memory (shared, dedicated, or group) that execute one or more software or firmware programs, a combinational logic circuit, and/or other suitable components that provide the described functionality. For purposes of clarity, the same reference numerals will be used to identify similar elements.

Referring now to FIG. 3, an improved wireless local area network is shown. The connection 6 links the DCS 8 to a QoS-enhanced access point (QAP) 20. The connection 6 may be provided by a wired, optical, and/or any other current or future type of connection. The QAP 20 has one or more antennas 22. One or more QoS-enhanced wireless stations (QSTA) 24-1, 24-2, 24-$j$, ..., 24-$n$, referred to collectively as QSTAs 24, are in wireless communication with the QAP 20. Each of the QSTAs 24 has an antenna 26-1, ..., 26-$n$ for wirelessly communicating with one of the antennas 22 of the QAP 20. Throughout this written description the variable "j" is used to indicate elements and/or steps related to one of the QSTAs 24. The variable "n" represents the total number of QSTAs connected to the QAP 20. Each of the QSTAs becomes associated with the QAP 20 when the QAP 20 allocates a portion of its wireless bandwidth to the QSTA 24-$j$. A method of establishing the association is described below.

Referring now to FIG. 4, an exemplary block diagram of the QAP 20 is shown. One or more antennas 22 are selectively connected to a physical layer (PHY) module 30. The PHY module 30 handles the interface with the wireless medium including transmitting and receiving RF signals. A medium access control (MAC) module 34 communicates with the PHY module 30. The MAC module 34 includes a scheduling module 36 that allocates time for the incoming data frames as will be described below. A timer 40 may be provided. An interface 42 provides a bidirectional digital communication path to the MAC 34.

In some implementations, the scheduling module 36 includes a framing module 37 that generates a schedule frame including schedule slots. An assigning module 38 assigns N sets of TxOps to the N wireless stations based on the N bandwidth parameters, respectively. Each of the schedule slots includes zero or one transmission opportunity (TxOp) for each of the N wireless stations. A polling module 39 polls the N wireless stations based on the TxOps defined in respective ones of the N sets of TxOps. As can be appreciated, functions performed by the modules in the scheduling module can be combined together in any manner.

Figure 5:
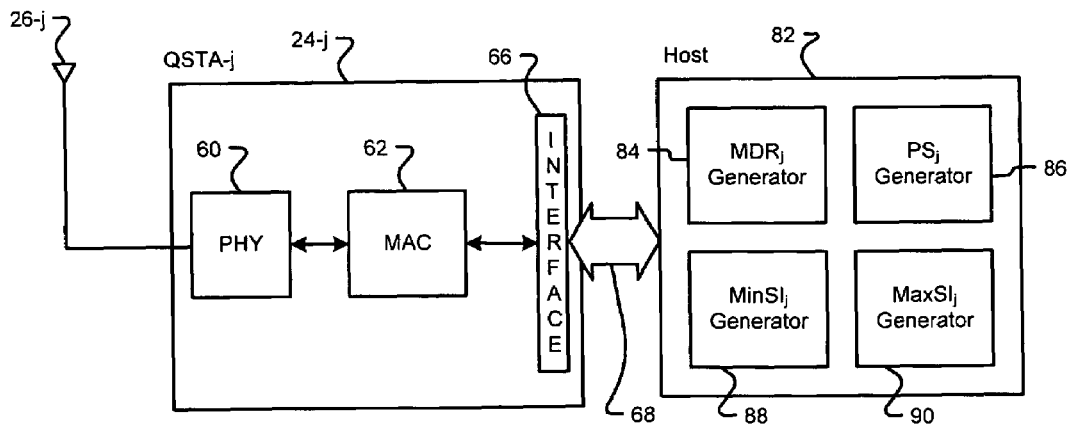
FIG. 5 is a functional block diagram of a QoS-enhanced wireless station.

Referring now to FIG. 5, the QSTA 24-$j$ is shown connected to a host 82. The QSTA-24$j$ includes a physical layer (PHY) module 60 that communicates with the antenna 26-$j$. A medium access control (MAC) module 62 communicates with the PHY module 60 and an external interface 66. An external bus connects the host 82 and the QSTA 24-$j$. The host 82 may be a computer or some other data processing device such as a voice over Internet Protocol (VoIP) telephone or digital television (DTV) and the like.

The host 82 includes one or more generating modules 84, 86, 88, and 90 for providing values to the QSTA 24. The values are indicative of bandwidth needed by the host 82. A mean data rate generator 84 provides a value, $MDR_j$, representative of a rate that the host 82 receives and/or generates data. $MDR_j$ may be expressed, for example, in units of bits per second (BPS). A packet size generator 86 provides a value, $PS_j$, representative of a size of the outgoing data packets provided by the host 82. The MAC 62 reads the outgoing data packets from the host interface 68. $PS_j$ may be expressed, for example, in units of bits.

A minimum service interval generator 88 provides a value indicative of a minimum amount of time, $MinSl_j$, that lapses between successive outgoing data packets and/or successive incoming data packets. $MinSl_j$ may be expressed, for example, in units of milliseconds (ms). A maximum service interval generator 90 provides a value, $MaxSl_j$, indicative of a maximum amount of time that may lapse between successive outgoing data packets and/or successive incoming data packets. $MaxSl_j$ may be expressed, for example, in units of ms. A single service interval generator may replace the minimum and maximum service interval generators 88, 90 in the event that $MinSl_j$ and $MaxSl_j$ are equal.

Figure 6:
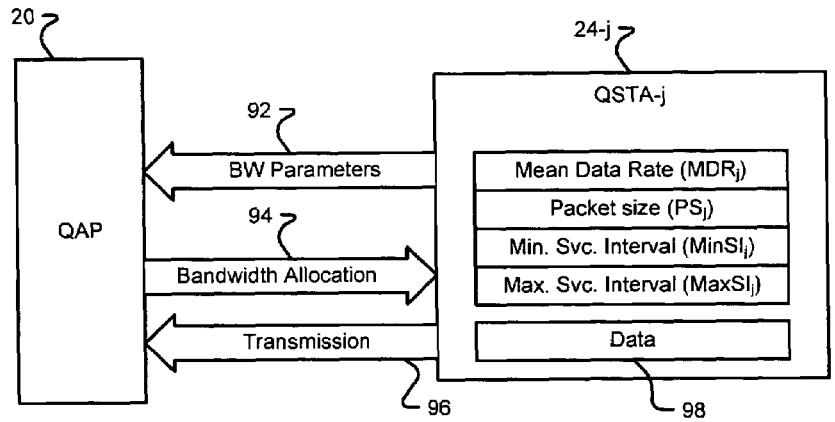
FIG. 6 is a functional block diagram of a wireless exchange between a QoS-enhanced access point and a QoS-enhanced wireless station.

Referring now to FIG. 6, a block diagram of a wireless exchange between the QSTA 24-j and the QAP 20 is shown. The QSTA 24-j sends stream parameters 92 to the QAP 20. The stream parameters 92 include the $MDR_j$, $PS_j$, $MinSl_j$, and $MaxSl_j$. The QAP 20 processes the stream parameters 92 in accordance with the method described below and determines whether it has sufficient bandwidth available to satisfy the stream parameters 92. If the QAP 20 has sufficient bandwidth available the QAP 20 transmits bandwidth allocation data (TxOp) 94 to the QSTA 24. The TxOp 94 includes a maximum amount of time that the QSTA 24 may transmit each time it makes a wireless transmission 96 of data 98 to the QAP 20. The TxOp 94 may be expressed, for example, in units of microseconds (μS).

Figure 7:
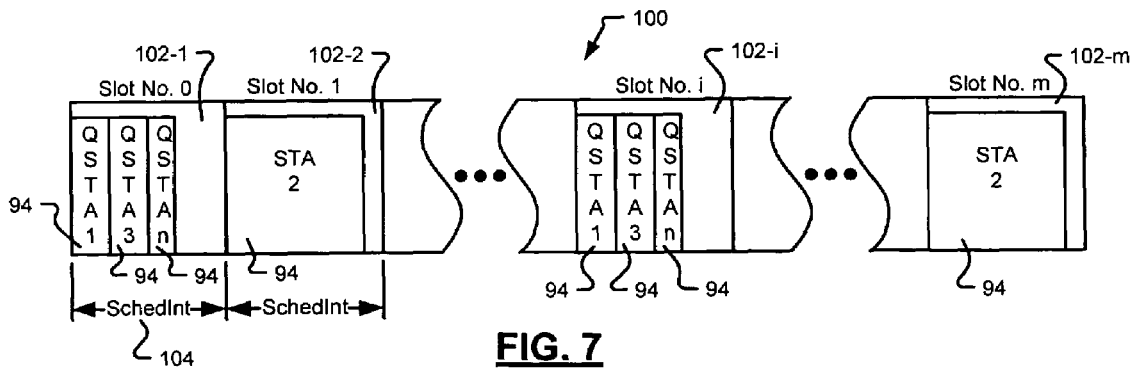
FIG. 7 illustrates a schedule frame.

Referring now to FIG. 7, a schedule frame 100 is shown. The schedule frame 100 is generated and used by the QAP 20 to account for and schedule the TxOps 94 of the QSTAs 24. A variable "m" represents a number of schedule slots 102. A variable "i" is used to indicate elements and/or steps related to one of the schedule slots 102. The schedule frame 100 is generated by the QAP 20 in accordance with the method described later below.

The schedule frame 100 represents a period of time divided into a number of schedule slots 102-1, 102-2, . . . , 102-i, . . . , 102-m, referred to collectively as schedule slots 102. A duration of each schedule slot 102 is equal to a scheduled interval (SchedInt) 104. Each of the schedule slots 102 may contain the TxOp 94 for one of the QSTAs 24. Each of the schedule slots 102 may also contain more than one TxOp 94 depending on the stream parameters 92 of the QSTAs 24 associated with the QAP 20. The schedule frame 100 may be represented by an array of memory locations used by the scheduler 36. Once every SchedInt 104, the MAC 34 polls the QSTAs 24 having a TxOp 94 in the current schedule slot 102. The MAC 34 repeatedly cycles through the schedule frame 100, thereby satisfying the stream parameters 92 of the QSTAs 24.

Figure 8A:
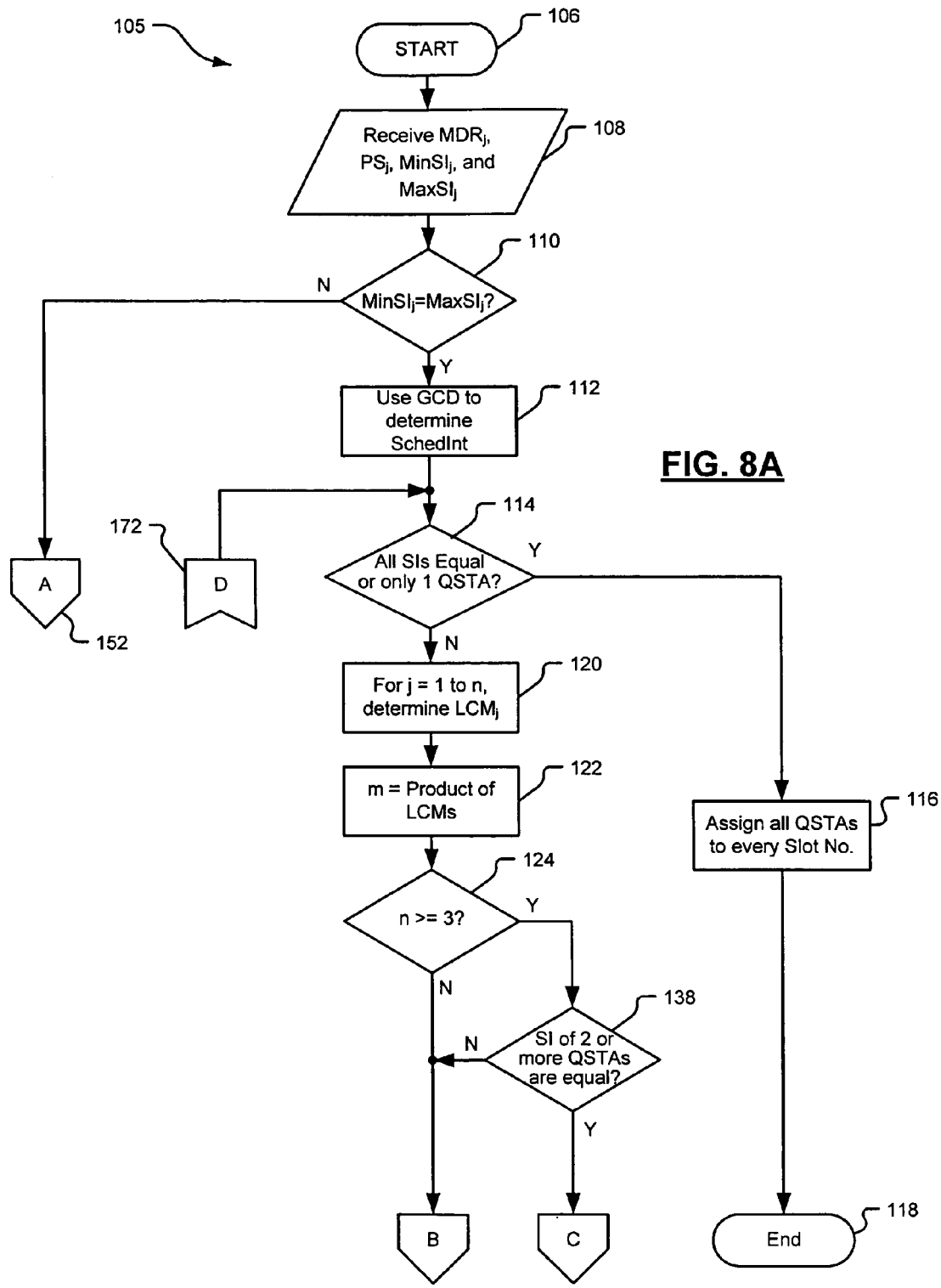
FIGS. 8A-C illustrate steps of a method for generating a schedule frame.
Figure 8B:
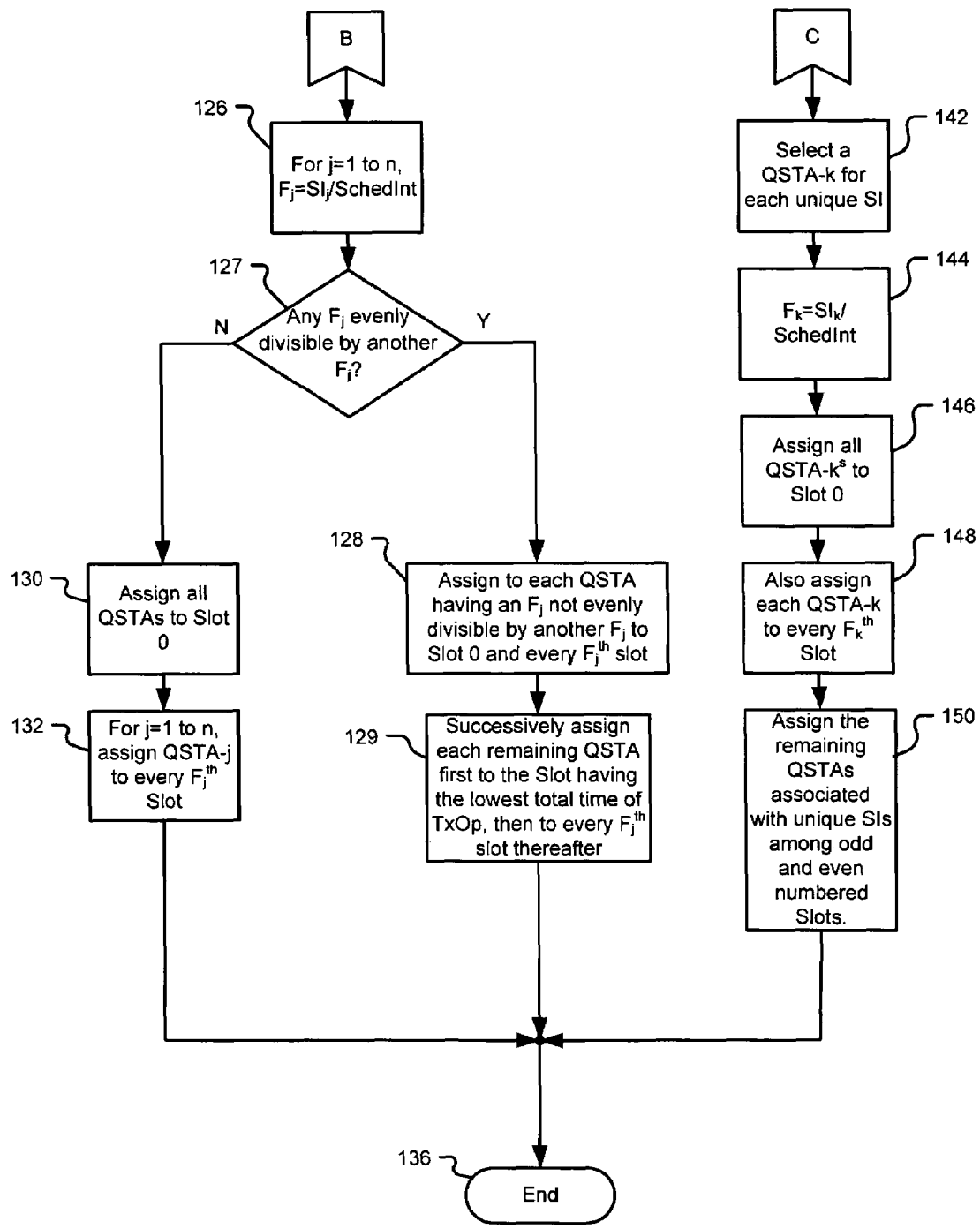
Figure 8C:
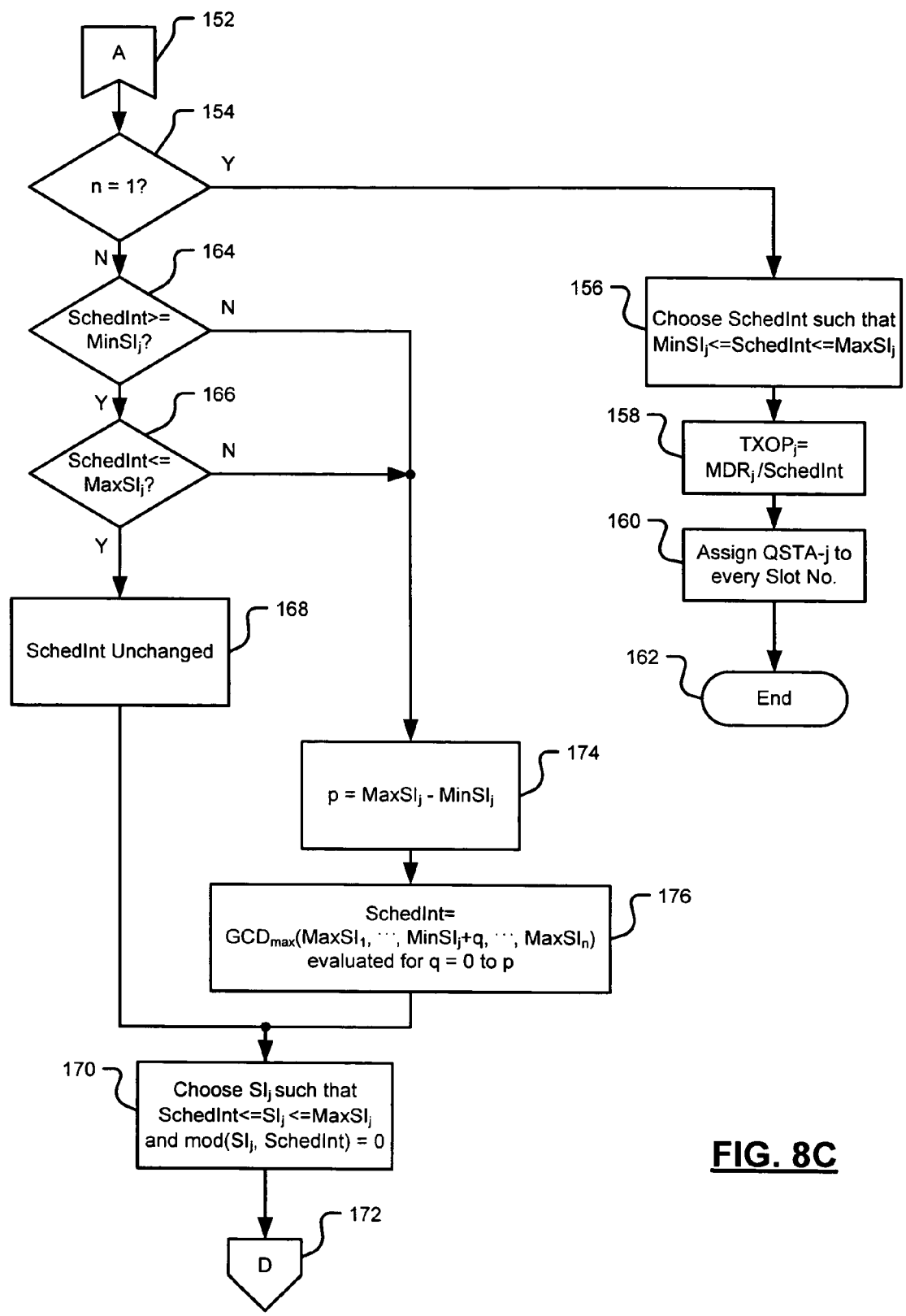

Referring now to FIGS. 8A-8C, a method 105 of generating a schedule frame 100 is shown. The method 105 is executed by the QAP 20 when it receives the stream parameters 92 from the QSTA 24-j attempting to associate with the QAP 20. Control begins in step 106 and proceeds to step 108 to receive the stream parameters 92. In step 110, control determines whether $MinSl_j$ and $MaxSl_j$ are equal. If step 110 is true, control proceeds to step 112. Throughout the remainder of this specification, the notation $Sl_j$ will be used to indicate an equal $MaxSl_j$ and $MinSl_j$. Step 112 determines the greatest common denominator (GCD) of the $Sl_j$ received together with the service intervals of the QSTAs 24 already associated with the QAP 20. Control proceeds to step 114 and determines whether the service intervals of the QSTAs 24 are equal and/or whether only one QSTA 24 is associating with the QAP 20. If so, control proceeds to step 116 and creates the schedule frame 100 having a single schedule slot 102-1. The SchedInt 104 is set equal to the common service interval of the QSTAs 24. The single schedule slot 102-1 allocates a unique TxOp 94 for each of the QSTAs 24. The duration of each TxOp 94 may be derived by dividing the $MDR_j$ for each of the QSTAs 24 by the SchedInt 104. Control terminates at step 118. The QAP 20 will thereafter poll each of the QSTAs 24 at the beginning of its respective TxOp 94. Each of the QSTAs 24 that have data 98 to send will send a transmission 96 upon being polled.

Returning now to decision step 114, if the service intervals of the QSTAs 24 are unequal then control proceeds to step 120. Step 120 determines a least common multiple ($LCM_j$) for all of the QSTAs 24 accessing the QAP 20. The $LCM_j$ for each QSTA 24-j is determined by factoring the quotient of the service interval $Sl_j$ of the QSTA 24-j divided by the GCD. Control then proceeds to step 122 and determines a number of schedule slots "m" by multiplying together unique $LCM_j$ values which were determined in step 120. Step 122 also generates the schedule frame 100 having m schedule slots consecutively numbered 0 through m−1. The duration of each schedule slot 102 is the SchedInt 104.

In step 124, control determines whether three or more QSTAs 24 are associated and/or attempting to associate with the QAP 20. If not, control proceeds to step 126. Step 126 determines an integer $F_j$ for each of the QSTAs 24. Each integer $F_j$ is equal to the $Sl_j$ of the QSTA 24-j divided by the SchedInt 104. Control then proceeds to decision step 127 and determines whether one of the integers $F_j$ is divisible by another one. If not, control proceeds to step 130 and assigns a TxOp 94 in the first schedule slot 102-1 to each of the QSTAs 24. Control then proceeds to step 132 and, for each QSTA 24-j, assigns a TxOp 94 to every $F_j^{th}$ schedule slot 102. Control then terminates at step 136. The QAP 20 will thereafter poll each of the QSTAs 24 at the beginning of its respective TxOp 94. Each of the QSTAs 24 having data 98 to send may send a transmission 96 upon being polled.

Returning now to step 127. Control branches to step 128 when it determines that one of the integers $F_j$ is divisible by another one. Step 128 assigns a TxOp 94 in schedule slot 102-1, and every $F_j^{th}$ schedule slot 102 thereafter, to each QSTA 24 having an $F_j$ that is not evenly divisible by another. Control then proceeds to step 129 and assigns each of the remaining QSTAs 24 a TxOp 94 in every $F_j^{th}$ schedule slot 102. The assignments begin preferably in an empty schedule slot 102-i and, if no empty schedule slot 102-i is available, in a schedule slot 102-i having the least total time of TxOps 94. Control then terminates at step 136. The QAP 20 will thereafter poll each of the QSTAs 24 at the beginning of its respective TxOp 94. Each of the QSTAs 24 having data 98 to send may send a transmission 96 upon being polled.

Returning now to FIG. 8A at step 124. If control determines that less than three QSTAs 24 are associated and/or attempting to associate with the QAP 20, then control proceeds to decision step 138. Decision step 138 determines whether the $Sl_j$ of two or more of the QSTAs 24 are equal. If two or more of the QSTAs 24 have equal $Sl_j$ values, then control proceeds to step 142. Step 142 groups together QSTAs 24 having equal service intervals and selects a representative QSTA 24-k from each group. Control then proceeds to step 144 and calculates an integer $F_k$ for each of the unique service intervals. Step 146 assigns a TxOp 94 in schedule slot 102-1 to each of the representative QSTAs 24-k. Control then proceeds to step 148 and assigns each representative QSTA 24-k a TxOp 94 in every $F_k^{th}$ schedule slot 102. Control then proceeds to step 150 and assigns, to each of the remaining QSTAs 24 in each group having a unique service interval, a TxOp 94 in every $F_k^{th}$ schedule slot 102. The assignments begin preferably in an empty schedule slot 102-$i$ and, if no suitable empty schedule slot 102-$i$ is available, in a schedule slot 102-$i$ having the least total time of TxOps 94. A suitable empty schedule slot is one which would not cause another schedule slot to have a total time of TxOps 94 that is equal to or greater than the SchedInt 104. Control then terminates at step 136. The QAP 20 will thereafter poll each of the QSTAs 24 at the beginning of its respective TxOp 94. Each of the QSTAs 24 having data 98 to send may send a transmission 96 upon being polled.

Returning now to FIG. 8A at decision step 110, if control determines that at least one of the QSTAs 24 has unequal minimum and maximum service intervals, then control proceeds to step 154. At step 154, control determines whether there is only one QSTA 24 associating and/or attempting to associate with the QAP 20. If so, then control proceeds to step 156 and chooses a SchedInt 104 that is greater than or equal to $MinSl_j$ and less than or equal to $MaxSl_j$ of the single QSTA 24. Control then proceeds to step 158 and determines a TxOp 94 for the single QSTA 24 by dividing its MDRj by the chosen SchedInt 104. Control then proceeds to step 160 and creates the schedule frame 100 having a single schedule slot 102-1 containing the TxOp 94. Control then terminates at step 162. The QAP 20 will thereafter poll the single QSTA 24 at the beginning of its TxOp 94. Upon being polled, the single QSTA 24 may send a transmission 96.

Returning now to decision step 154, if control determines there is more than one QSTA 24 associating with the QAP 20, then control proceeds to decision steps 164 and 166. In decision steps 164 and 166, control determines whether the present SchedInt 104 is between the $MinSl_j$ and $MaxSl_j$ of the QSTA 24-$j$ now attempting to associate with the QAP 20. If so, then control proceeds to step 168 and the SchedInt 104 remains unchanged. Control then proceeds to step 170 and chooses a service interval $Sl_j$ for the QSTA 24-$j$ that is between the $MinSl_j$ and $MaxSl_j$ of the QSTA 24-$j$. The SchedInt 104 is evenly divisible by the chosen $Sl_j$. Control then proceeds to decision step 114 and continues as described previously.

Returning now to decision steps 164 and 166, control proceeds to step 174 when it determines that the QSTA 24-$j$ attempting to associate with the QAP 20 has $MinSl_j$ and $MaxSl_j$ that are unsatisfied by the present SchedInt 104. In step 174, control determines a difference "p" between the $MaxSl_j$ and the $MinSl_j$ of the QSTA 24-$j$. Control then proceeds to step 176 and determines the GCD of each combination of the $MaxSl_j$s of the QSTAs 24. For each combination, a new $MaxSl_j$ for the QSTA 24-$j$ is derived by adding an integer variable "q" to $MinSl_j$. The variable q begins at zero and is incremented to form each combination of $MaxSl_j$s. This process is repeated until q=p. Control then sets the SchedInt 104 equal to the highest GCD found in the combinations $MAxSl_j$s. Control then proceeds to step 170 and continues as described previously.

Figure 9:
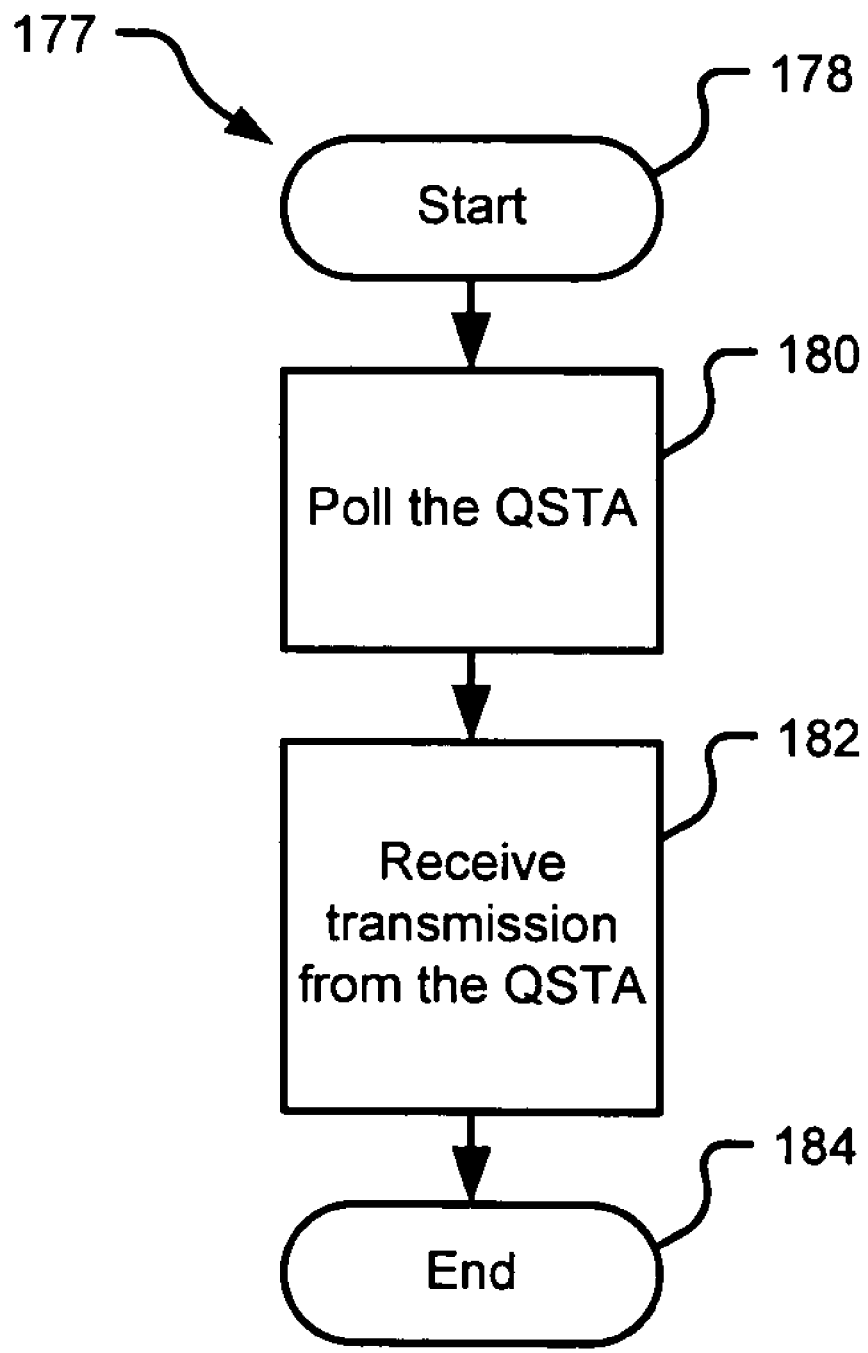
FIG. 9 illustrates steps of a method for polling a QoS-enhanced wireless station.

Referring now to FIG. 9, a method 177 of polling the QSTAs 24 is shown. The QAP 20 executes the method 177 at the beginning of each TxOp 94. Control proceeds from step 178 to step 180 and polls the QSTA 24-$j$ associated with the present TxOp 94. Control then proceeds to step 182 and receives the transmission 96, if any, from the QSTA 24-$j$. If the QAP 20 does not receive a transmission 96 from the wireless station, then the QAP 20 may prematurely terminate the present TxOp 94 and initiate the next TxOp 94, if any, in the schedule slot 102-$i$.

Referring now to FIGS. 10A-10G, examples of schedule frames 100 are shown in table formats for varying combinations of QSTAs 24. Columns of each table represent the schedule slots 102, and rows of each table represent the QSTAs 24. An X at the intersection of a column and row indicates a TxOp 94 in the respective schedule slot 102 for the respective QSTA 24-$j$. Generation of the example schedule frames will be described in accordance with the method 105 of FIGS. 8A-8C.

Figure 10A:
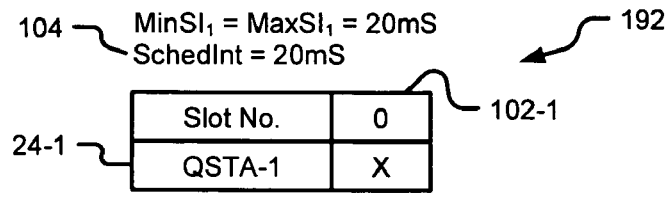
FIGS. 10 A-G illustrate example schedule frames.

Referring now to FIG. 10A, an example schedule frame 192 is shown for a single QSTA 24-1 having $MinSl_1$ and $MaxSl_1$ equal to 20 mS. As the QSTA 24-1 attempts to associate with the QAP 20, the method 105 enters at step 106. Step 108 receives the data stream bandwidth values $MinSl_j$, $MaxSl_j$, $PS_j$, and $MDR_j$. Step 110 determines that $MinSl_j$ and $MaxSl_j$ are equal and branches to step 112. Step 112 determines the GCD of 20 mS and sets SchedInt 104 equal to 20 mS. Step 114 determines that only one QSTA 24-1 is associating with the QAP 20 and branches to step 116. Step 116 generates the example schedule frame 192 having the SchedInt 104 of 20 mS and a single schedule slot 194. Step 116 also assigns the QSTA 24-1 the TxOp 94 in the single schedule slot 188.

Figure 10B:
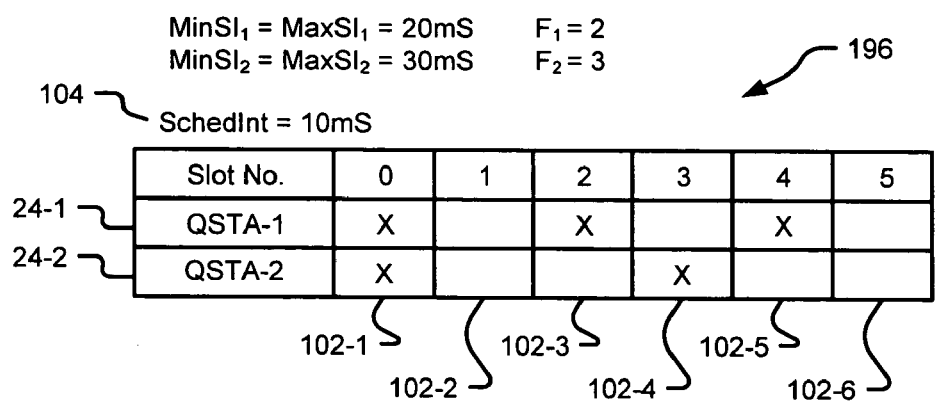

Referring now to FIG. 10B, an example schedule frame 196 for two QSTAs 24-1 and 24-2 is shown. The first QSTA 24-1 has $MinSl_1$ and $MaxSl_1$ equal to 20 mS. The second QSTA 24-2 has $MinSl_2$ and $MaxSl_2$ equal to 30 mS. The following discussion assumes that the first QSTA 24-1 is already associated with the QAP 20. As the second QSTA 24-2 attempts to associate with the QAP 20, step 100 determines that $MinSl_2$ and $MaxSl_2$ are equal and branches to step 112. Step 112 determines the GCD of 20 mS and 30 mS to arrive at the SchedInt 104 of 10 mS. Step 114 determines the service intervals of the first and second QSTAs 24-1, 24-2 are unequal and branches to step 120. Step 120 determines the LCMs of the first and second QSTAs 24-1, 24-2 are 2 and 3, respectively. Step 122 multiplies the LCMs to arrive at six schedule slots 102, numbered 0 through 5, in the schedule frame 196. Step 124 determines that there are less than three QSTAs 24 associating with the QAP 20 and branches to step 128. Step 128 determines the integers $F_1$ and $F_2$ for the first and second QSTAs 24-1, 24-2. Step 186 determines that neither $F_1$ nor $F_2$ is divisible by the other and branches to step 130. Step 130 assigns each of the first and second QSTAs 24-1, 24-2 a TxOp 94 in Slot 0. Step 132 then assigns the first QSTA 24-1 additional TxOps 94 in every second slot (since $F_1$=2), and assigns the second QSTA 24-2 additional TxOps 94 in every third slot (since $F_2$=3).

Figure 10C:
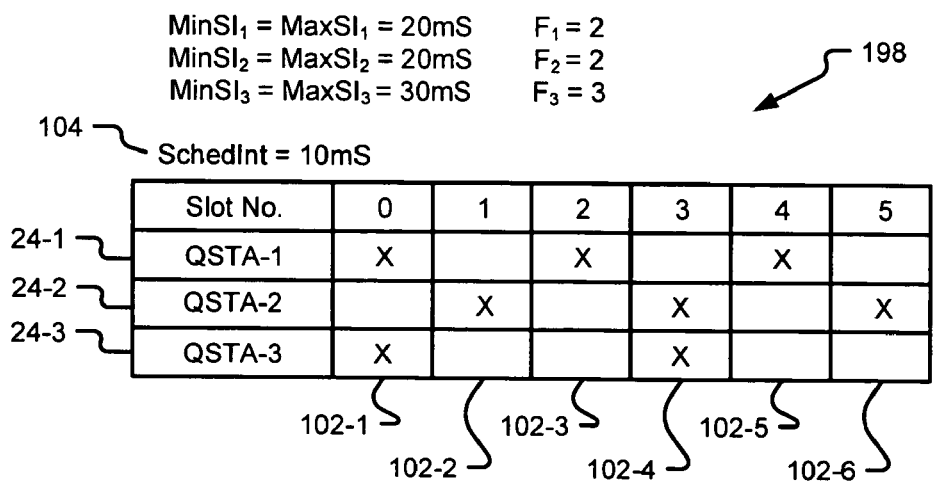

Referring now to FIG. 10C, an example schedule frame 198 for three QSTAs 24-1, 24-2, and 24-3 is shown. The first QSTA 24-1 has $MinSl_1$ and $MaxSl_1$ equal to 20 mS. The second QSTA 24-2 has $MinSl_2$ and $MaxSl_2$ also equal to 20 mS. The third QSTA 24-3 has $MinSl_3$ and $MaxSl_3$ equal to 30 mS. The following discussion assumes that the first and second QSTAs 24-1 and 24-2 are already associated with the QAP 20. Step 110 determines that each of the QSTAs 24 has a minimum service interval and a maximum service interval that are equal and branches to step 112. Step 112 determines the GCD of the service intervals and arrives at a SchedInt 104 of 10 mS. Step 114 determines the service intervals of the QSTAs 24 are unequal and branches to step 120. Steps 120 and 122 determine the least common multiples of the QSTAs 24 and arrive at six schedule slots 102, numbered 0 through 5, in the schedule frame 198. Step 124 determines that there are three or more QSTAs 24 associating with the QAP 20 and branches to step 138. Step 138 determines that QSTAs 24-1 and 24-2 have equal service intervals and branches to step 142. Step 142 selects QSTA 24-1 to represent the mS service interval and QSTA 24-3 to represent the 30 mS service interval. Step 144 determines the integer $F_k$ for each of the representative QSTAs 24-1 and 24-3. Step 146 assigns each representative QSTA 24-1 and 24-3 a TxOp 94 in Slot 0. Step 148 further assigns each representative QSTA 24-1 and 24-3 additional TxOps 94 in every $F_k{}^{th}$ slot starting from Slot 0. Step 150 assigns the remaining QSTA 24-2 a TxOp 94 in Slot 1 since it is the first empty schedule slot, and every $F_k{}^{th}$ slot thereafter.

Figure 10D:
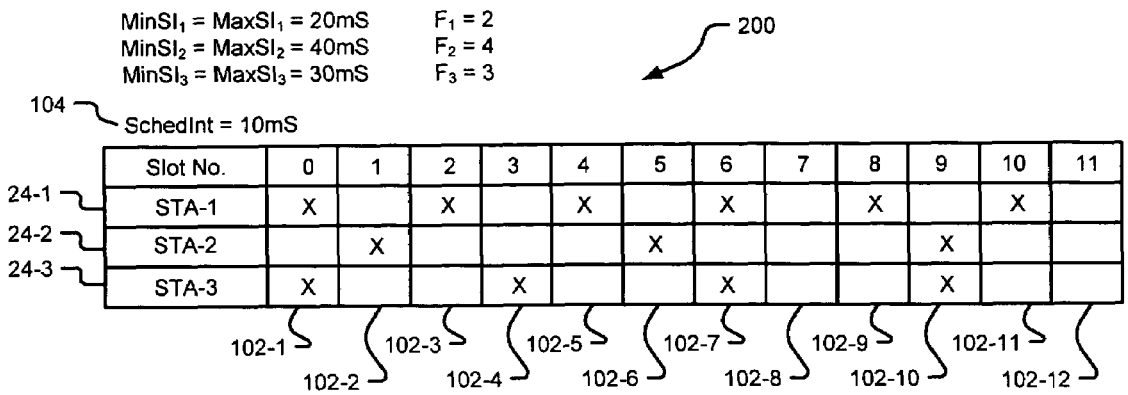
Figure 10E:
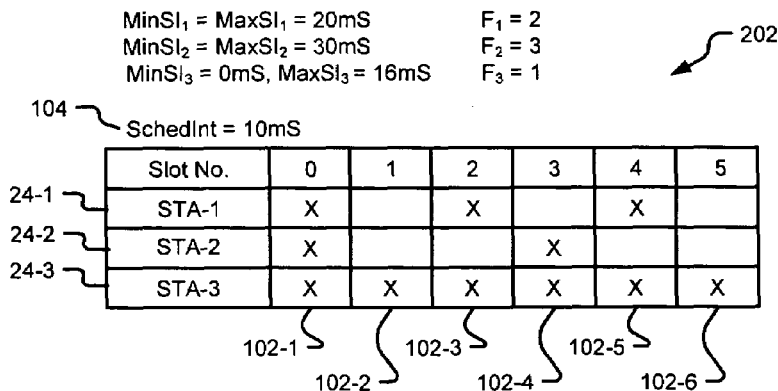

Referring now to FIG. 10D, an example schedule frame 200 for three QSTAs 24-1, 24-2, and 24-3 is shown. The first QSTA 24-1 has $MinSl_1$ and $MaxSl_1$ equal to 20 mS. The second QSTA 24-2 has $MinSl_2$ and $MaxSl_2$ equal to 40 mS. The third QSTA 24-3 has $MinSl_3$ and $MaxSl_3$ equal to 30 mS. The following discussion assumes that the first and second QSTAs 24-1 and 24-2 are already associated with the QAP 20. Step 110 determines that each of the wireless stations has an equal minimum and maximum service interval and branches to step 112. Step 112 determines the GCD of the service intervals and arrives at a SchedInt 104 of 10 mS. Step 114 determines that the service intervals of the QSTAs 24 are unequal and branches to step 120. Steps 120 and 122 determine the least common multiples of the QSTAs 24 and arrive at twelve schedule slots, numbered 0 through 11, in the schedule frame 200. Step 124 determines that there are three QSTAs 24 and branches to step 138. Step 138 determines that each of the QSTAs 24 has a unique service interval and branches to step 126 to determine the integer $F_j$ for each of the QSTAs 24. Step 127 determines that $F_2$ is evenly divisible by $F_1$ and branches to step 128. Step 128 assigns the first and third QSTAs 24-1, 24-3 a TxOp 94 in Slot 0 and every $F_j{}^{th}$ Slot thereafter. Step 129 assigns the second QSTA 24-2 a TxOp 94 in Slot 1 and every $F_j{}^{th}$ slot thereafter.

Referring now to FIGS. 8A-8C and 10E, an example schedule frame 202 for three QSTAs 24 is shown. The first QSTA 24-1 has $MinSl_1$ and $MaxSl_1$ equal to 20 mS. The second QSTA 24-2 has $MinSl_2$ and $MaxSl_2$ equal to 30 mS. The third QSTA 24-3 has $MinSl_3$ equal to 0 mS and $MaxSl_3$ equal to 16 mS. The following discussion assumes that the first and second QSTAs 24-1 and 24-2 are already associated with the QAP 20. Step 110 determines that the third QSTA 24-3 has unequal $MinSl_3$ and $MaxSl_3$ and branches to step 154. Step 154 determines that more than one QSTA 24 is associating with the QAP 20 and branches to step 164. Steps 164 and 166 determine that the present SchedInt 104 of 10 mS, which was derived prior to the third QSTA 24-3 attempting to associate with the QAP 20, is between the $MinSl_3$ and $MaxSl_3$ of the third QSTA 24-3. The method therefore proceeds to step 168 and allows the SchedInt 104 to remain at 10 mS. Step 170 chooses a service interval for the third QSTA 24-3 that evenly divides into the SchedInt 104. Control then proceeds to step 114 and continues as though the third QSTA 24-3 now has $MinSl_3$ and $MaxSl_3$ equal to 10 mS.

Referring now to FIGS. 8A-8C and 10F, an example schedule frame 204 for three QSTAs 24 is shown. The first QSTA 24-1 has $MinSl_1$ and $MaxSl_1$ equal to 20 mS. The second QSTA 24-2 has $MinSl_2$ and $MaxSl_2$ equal to 30 mS. The third QSTA 24-3 has $MinSl_3$ equal to 0 mS and $MaxSl_3$ equal to 5 mS. The following discussion assumes that the first and second QSTAs 24-1 and 24-2 are already associated with the QAP 20, and that the QAP 20 initially has a SchedInt 104 of 10 mS (see example of FIG. 10B). Step 110 determines that the third QSTA 24-3 has unequal $MinSl_3$ and $MaxSl_3$ and branches to step 154. Step 154 branches to step 164 after determining that more than one QSTA 24 is associating with QAP 20. Step 164 determines that the present SchedInt 104 of 10 mS is greater than the third wireless station's $MinSl_3$ of 5 mS and branches to step 166. Step 166 determines that the present SchedInt 104 of 10 mS is greater than the third wireless station's $MinSl_3$ of 5 mS and branches to step 174. Step 176 repeatedly determines a GCD, and with each repetition substitutes a new $MaxSl_1$ for the third QSTA 24-3. The $MaxSl_j$ increases by one with each repetition of the GCD determination. The maximum GCD from the repeated determinations is then used as the SchedInt 104. In this case, the SchedInt 104 is set to 5 mS. Step 170 chooses a service interval for the third QSTA 24-1 of 5 mS. Control then proceeds to step 114 and continues as though the third QSTA 24-3 now has $MinSl_3$ and $MaxSl_3$ equal to 5 mS.

Referring now to FIGS. 8A-8C and 10G, an example schedule frame 206 for three QSTAs 24 is shown. The first QSTA 24-1 has $MinSl_1$ and $MaxSl_1$ equal to 20 mS. The second QSTA 24-2 has $MinSl_2$ and $MaxSl_2$ equal to 30 mS. The third QSTA 24-3 has $MinSl_3$ equal to 18 mS and $MaxSl_3$ equal to 22 mS. The following discussion assumes that the first and second QSTAs 24-1 and 24-2 are already associated with the QAP 20, and that the QAP 20 initially has SchedInt 104 equal to 10 mS (see example of FIG. 10B). Step 110 determines that the third QSTA 24-3 has unequal $MinSl_3$ and $MaxSl_3$ and branches to step 154. Step 154 determines that more than one QSTA 24 is associating with the QAP 20 and branches to step 164. Step 164 determines that the present SchedInt 104 of 10 mS is greater than the third wireless station's $MinSl_3$ of 5 mS and branches to step 174. Step 176 repeatedly determines a GCD, and with each repetition substitutes a new $MaxSl_j$ for the third QSTA 24-3. The $MaxSl_j$ increases by one with each repetition of the GCD determination. The maximum GCD from the repeated determinations is then used as the SchedInt 104. In this case, the SchedInt 104 is set to 10 mS. Step 170 chooses a service interval for the third QSTA 24-1 of 20 mS. Control then proceeds to step 114 and continues as though the third QSTA 24-3 now has $MinSl_3$ and $MaxSl_3$ equal to 20 mS.

Referring now to FIG. 11, an alternative schedule frame 208 is shown. The alternative schedule frame 208 is identical to the example schedule frame 196 shown in FIG. 10B, except the TxOps 94 for the second QSTA 24-2 have been shifted to an alternative set of schedule slots 102. The QAP 20 monitors a packet error rate (PER) associated with the wireless transmissions 96 from each of the QSTAs 24. The QAP 2Q shifts the TxOps 94 of a particular QSTA 24 when the PER of the particular QSTA 24 exceeds a predetermined PER.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A scheduler for a wireless network, the wireless network including N wireless stations having N bandwidth parameters, respectively, the scheduler comprising:

a framing module that generates a schedule frame including schedule slots;

an assigning module that assigns N sets of transmission opportunities (TxOps) to the N wireless stations based on the N bandwidth parameters, respectively, wherein each of the schedule slots includes zero or one transmission opportunity (TxOp) for each of the N wireless stations; and a polling module that polls the N wireless stations based on the TxOps defined in respective ones of the N sets of TxOps, wherein the assigning module determines a greatest common denominator (GCD) of N service intervals of the N wireless stations and least common multiples (LCMs) of the N service intervals, and wherein the framing module generates the schedule frame based on the GCD and the LCMs.

2. A system comprising the scheduler of claim 1 and further comprising a physical layer module that receives the N bandwidth parameters from the N wireless stations, respectively, wherein N is an integer greater than or equal to one.

3. The system of claim 2 wherein each of the N bandwidth parameters include a maximum service interval, a minimum service interval, a packet size and a mean data rate.

4. The system of claim 2 wherein the physical layer device outputs TxOp durations to the N wireless stations.

5. The scheduler of claim 1 wherein the schedule slots are of equal duration.

6. The scheduler of claim 1 wherein the assigning module substantially uniformly distributes the TxOps among the schedule slots in each of the N sets based on respective ones of the N bandwidth requirements.

7. The scheduler of claim 6 wherein the assigning module shifts the TxOps in one of the N sets to an alternative set of TxOps when a packet error rate (PER) of a respective one of the N wireless stations exceeds a predetermined PER.

8. The scheduler of claim 7 wherein when the assigning module shifting the TxOps in one of the N sets to an alternative set of TxOps, a service interval corresponding to said one of the N wireless stations decreases.

9. A wireless access point comprising the scheduler of claim 1.

10. The wireless access point of claim 9 wherein the scheduler is implemented in a medium access control (MAC) module.

11. A wireless network comprising the access point of claim 9 and further comprising the N wireless stations.

12. The scheduler of claim 1 wherein each of the N bandwidth parameters include a service interval.

13. The scheduler of claim 1 wherein the assigning module determines a TxOp duration of the TxOps for each of the N wireless stations.

14. The scheduler of claim 13 wherein the TxOp duration of one of the N sets is different than the TxOp duration of another of the N sets.

15. The scheduler of claim 1 wherein the duration of each schedule slot is equal to the GCD and the number of schedule slots in the schedule frame is based on the LCMs.

16. The scheduler of claim 1 wherein the N bandwidth parameters of one of the N wireless stations includes include a minimum service interval that is different than a maximum service interval, which define a scheduling interval range, wherein the assigning module calculates GCDs of potential service intervals in the scheduling interval range and the service intervals of others of the N wireless stations, and wherein the assigning module selects one of the potential service intervals having a largest GCD as a substitute service interval.

17. The scheduler of claim 1 wherein the wireless network is otherwise compliant with one of IEEE 802.11, 802.11a, 802.11b, 802.11g, 802.11h, and/or 802.11n.

18. The scheduler of claim 1 wherein a first set of TxOps corresponds with a first station and a second set of TxOps corresponds with a second station, and wherein the first set of TxOps has more TxOps than the second set of TxOps.

19. The scheduler of claim 1 wherein said assigning module assigns a different number of schedule slots to each of the N wireless stations.

20. The scheduler of claim 1 wherein a plurality of the N wireless stations share each of a first plurality of the schedule slots, and wherein one of the schedule slots is designated solely to one of the N wireless stations.

21. The scheduler of claim 1 wherein said assigning module assigns said N sets of TxOps based on service intervals corresponding to at least one of successive outgoing data packets and successive incoming data packets of each of the N wireless stations having the same duration.

22. The scheduler of claim 21 wherein the assigning module assigns each of the N wireless stations to each of the schedule slots when the service intervals have the same duration, and wherein the assigning module does not assign each of the N wireless stations to each of the schedule slots when the service intervals have different durations.

23. The scheduler of claim 1 wherein said assigning module determines a value F for each of the N wireless stations that is equal to a service interval for a respective one of the N wireless stations divided by a schedule interval, and wherein said assigning module assigns said N sets of TxOps based on a relationship between said F values.

24. The scheduler of claim 23 wherein said assigning module assigns said N sets of TxOps based on when a first value $F_1$ of a first one of the N wireless stations is evenly divisible by a second value $F_2$ of a second one of the N wireless stations.

25. The scheduler of claim 1 wherein said assigning module assigns said N sets of TxOps based on the value F and a number of the schedule slots in the schedule frame.

26. The scheduler of claim 1 wherein said assigning module determines said value F, and wherein said assigning module allocates each $F^{th}$ schedule slot for one of the N wireless stations.

27. A scheduler for a wireless network, the wireless network including N wireless stations having N bandwidth parameters, respectively, the scheduler comprising:

framing means for generating a schedule frame including schedule slots;

assigning means for assigning N sets of transmission opportunities (TxOps) to the N wireless stations based on the N bandwidth parameters, respectively, wherein each of the schedule slots includes zero or one transmission opportunity (TxOp) for each of the N wireless stations; and polling means for polling the N wireless stations based on the TxOps defined in respective ones of the N sets of TxOps, wherein the assigning means determines a greatest common denominator (GCD) of N service intervals of the N wireless stations and least common multiples (LCMs) of the N service intervals, and wherein the framing means generates the schedule frame based on the GCD and the LCMs.

28. A system comprising the scheduler of claim 27 and further comprising physical layer means for receiving the N bandwidth parameters from the N wireless stations, respectively, wherein N is an integer greater than or equal to one.

29. The system of claim 28 wherein each of the N bandwidth parameters include a maximum service interval, a minimum service interval, a packet size and a mean data rate.

30. The system of claim 28 wherein the physical layer device outputs TxOp durations to the N wireless stations.

31. The scheduler of claim 27 wherein the schedule slots are of equal duration.

32. The scheduler of claim 27 wherein the assigning means substantially uniformly distributes the TxOps among the schedule slots in each of the N sets based on respective ones of the N bandwidth requirements.

33. The scheduler of claim 32 wherein the assigning means shifts the TxOps in one of the N sets to an alternative set of TxOps when a packet error rate (PER) of a respective one of the N wireless stations exceeds a predetermined PER.

34. A wireless access point comprising the scheduler of claim 27.

35. The wireless access point of claim 34 wherein the scheduler is implemented in a medium access control (MAC) module.

36. A wireless network comprising the access point of claim 34 and further comprising the N wireless stations.

37. The scheduler of claim 27 wherein each of the N bandwidth parameters include a service interval.

38. The scheduler of claim 27 wherein the assigning means determines a TxOp duration of the TxOps for each of the N wireless stations.

39. The scheduler of claim 38 wherein the TxOp duration of one of the N sets is different than the TxOp duration of another of the N sets.

40. The scheduler of claim 27 wherein the duration of each schedule slot is equal to the GCD and the number of schedule slots in the schedule frame is based on the LCMs.

41. The scheduler of claim 27 wherein the N bandwidth parameters of one of the N wireless stations includes include a minimum service interval that is different than a maximum service interval, which define a scheduling interval range, wherein the assigning means calculates GCDs of potential service intervals in the scheduling interval range and the service intervals of others of the N wireless stations, and wherein the assigning means selects one of the potential service intervals having a largest GCD as a substitute service interval.

42. The scheduler of claim 27 wherein the wireless network is otherwise compliant with one of IEEE 802.11, 802.11a, 802.11b, 802.11g, 802.11h, and/or 802.11n.

43. A method for scheduling in a wireless network, the wireless network including N wireless stations having N bandwidth parameters, respectively, the method comprising:
 determining a greatest common denominator (GCD) of N service intervals of the N wireless stations and least common multiples (LCMs) of the N service intervals;
 generating a schedule frame including schedule slots based on the GCD and the LCMs;
 assigning N sets of transmission opportunities (TxOps) to the N wireless stations based on the N bandwidth parameters, respectively, wherein each of the schedule slots includes zero or one transmission opportunity (TxOp) for each of the N wireless stations; and
 polling the N wireless stations based on the TxOps defined in respective ones of the N sets of TxOps.

44. The method of claim 43 further comprising receiving the N bandwidth parameters from the N wireless stations, respectively, wherein N is an integer greater than or equal to one.

45. The method of claim 44 wherein each of the N bandwidth parameters include a maximum service interval, a minimum service interval, a packet size and a mean data rate.

46. The method of claim 44 further comprising assigning and transmitting TxOp durations to the N wireless stations.

47. The method of claim 43 wherein the schedule slots are of equal duration.

48. The method of claim 43 further comprising substantially uniformly distributing the TxOps among the schedule slots in each of the N sets based on respective ones of the N bandwidth requirements.

49. The method of claim 48 further comprising shifting the TxOps in one of the N sets to an alternative set of TxOps when a packet error rate (PER) of a respective one of the N wireless stations exceeds a predetermined PER.

50. The method of claim 43 wherein each of the N bandwidth parameters include a service interval.

51. The method of claim 43 further comprising determining a TxOp duration of the TxOps for each of the N wireless stations.

52. The method of claim 51 wherein the TxOp duration of one of the N sets is different than the TxOp duration of another of the N sets.

53. The method of claim 43 further comprising:
 setting the duration of each schedule slot equal to the GCD; and
 basing the number of schedule slots in the schedule frame on the LCMs.

54. The method of claim 43 wherein the N bandwidth parameters of one of the N wireless stations includes include a minimum service interval that is different than a maximum service interval, which define a scheduling interval range, and further comprising:
 calculating GCDs of potential service intervals in the scheduling interval range and the service intervals of others of the N wireless stations; and
 selecting one of the potential service intervals having a largest GCD as a substitute service interval.

55. The method of claim 43 wherein the wireless network is otherwise compliant with one of IEEE 802.11, 802.11a, 802.11b, 802.11g, 802.11h, and/or 802.11n.

* * * * *

UNITED STATES PATENT AND TRADEMARK OFFICE
CERTIFICATE OF CORRECTION

PATENT NO. : 7,502,358 B1  Page 1 of 1
APPLICATION NO. : 11/101047
DATED : March 10, 2009
INVENTOR(S) : Rahul Kopikare et al.

It is certified that error appears in the above-identified patent and that said Letters Patent is hereby corrected as shown below:

| | |
|---|---|
| Column 9, Line 1 | Delete "mS" and insert -- 20mS -- |
| Column 10, Line 6 | Delete "MaxSl$_1$" and insert -- MaxSl$_j$ -- |
| Column 10, Line 44 | Delete "2Q" and insert -- 20 -- |
| Column 11, Line 53 | Delete "include" after "includes" |
| Column 13, Line 32 | Delete "include" after "includes" |
| Column 14, Line 40 | Delete "include" after "includes" |

Signed and Sealed this

First Day of September, 2009

David J. Kappos
*Director of the United States Patent and Trademark Office*